July 7, 1942.    F. G. CRONE    2,288,790
LATHE
Filed June 6, 1941
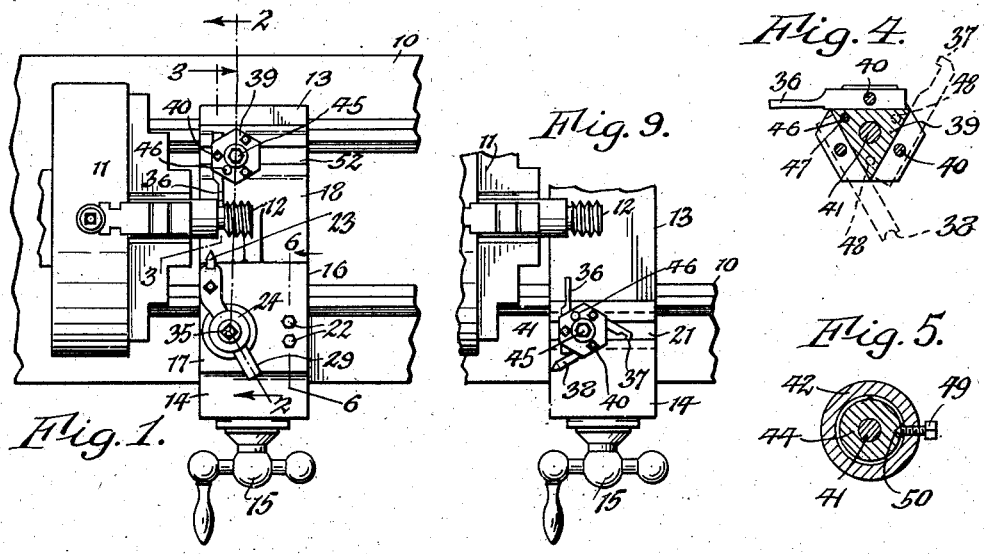
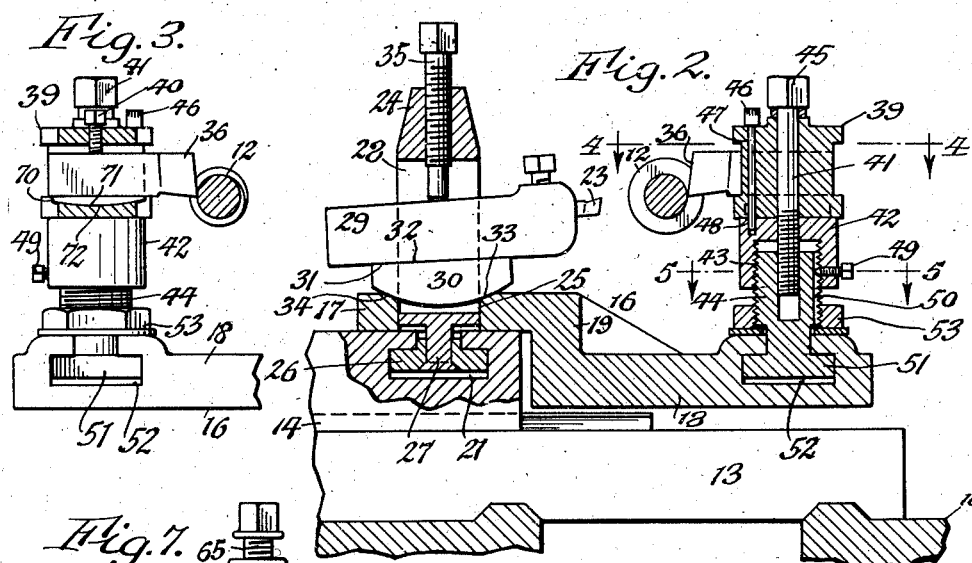
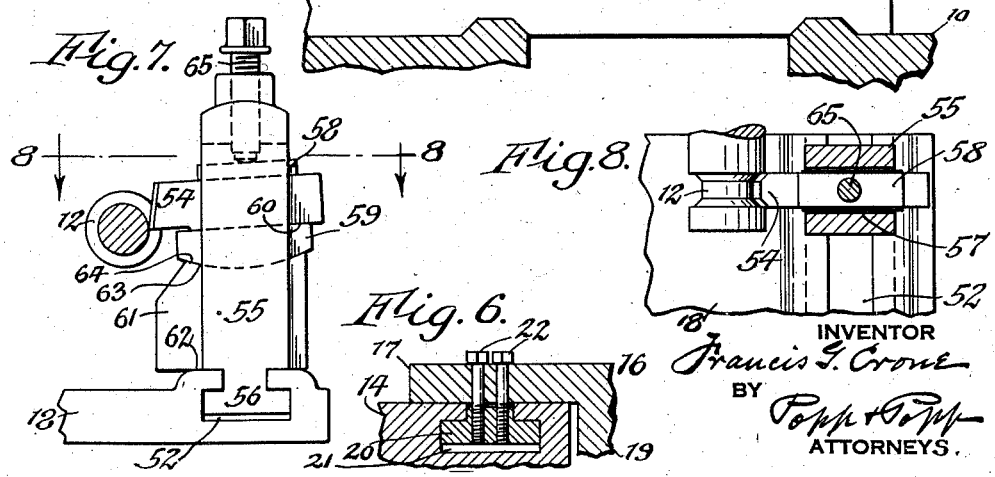
INVENTOR
Francis G. Crone
BY
Popp & Popp
ATTORNEYS.

Patented July 7, 1942

2,288,790

UNITED STATES PATENT OFFICE 2,288,790

LATHE

Francis G. Crone, Buffalo, N. Y.

Application June 6, 1941, Serial No. 396,891

2 Claims. (Cl. 82—37)

This invention relates to lathes and more particularly to an attachment for lathes whereby the same may be operated by the use of either a single tool holder on one side or the other of the center, or tool holders may be employed on both sides of the center and engaged as required with the work piece which is being operated on.

It is the purpose of this invention to provide an attachment of this character which is very simple in construction and capable of being quickly and easily mounted in a single slide tool lathe so as to permit not only of doing comparatively simple work on the lathe but also more complicated work which heretofore required more elaborate and expensive equipment.

In the accompanying drawing:

Fig. 1 is a fragmentary top plan view of a single slide tool lathe embodying one form of this invention.

Figs. 2 and 3 are vertical transverse sections of the same, on an enlarged scale, taken on the correspondingly numbered lines in Fig. 1.

Figs. 4 and 5 are horizontal sections taken on the correspondingly numbered lines in Fig. 2.

Fig. 6 is a fragmentary vertical cross section taken on line 6—6, Fig. 1.

Fig. 7 is a fragmentary elevation similar to the right hand part of Fig. 2, but showing a tool mounting organized for holding a single tool.

Fig. 8 is a horizontal section taken on line 8—8, Fig. 7.

Fig. 9 is a fragmentary top plan view similar to Fig. 1, but showing a multiple tool holder on the front part of the cross slide.

In the following description similar reference characters indicate like parts in the several figures of the drawing.

Referring to Figures 1–6, the numeral 10 represents the bed or main frame of the lathe, 11 the chuck rotatably mounted on the front end of the bed and adapted to hold the work piece 12, which is to be operated upon, 13 the main carriage which is slidable lengthwise on the bed, and 14 the cross slide which is adjustable crosswise on the carriage and adapted to be shifted manually by a cross slide screw 15 in the usual and well known manner.

The numeral 16 represents a supporting bracket which is adapted to support tools on the front side and also on the rear side of the axis of the chuck for operating on the corresponding sides of the work piece. In its preferred construction this bracket is Z-shaped and provided with a front elevated horizontal arm 17 which is secured to the top of the cross slide and adapted to carry a front tool support, a rear depressed horizontal arm 18 arranged transversely below the axis of the chuck and work piece and adapted to carry a rear tool support, and a vertical intermediate web 19 connecting said front and rear arms, as shown in Fig. 2. This bracket is slidably guided on the cross slide lengthwise of the axis of the chuck by means of a T-shaped coupling or guiding block 20 arranged in a correspondingly shaped slot 21 formed lengthwise in the cross slide and bolts 22 connecting the bracket and the coupling block, as shown in Fig. 6.

On the front arm of the bracket is mounted a cutting tool 23 which is adapted to produce a cut on the work piece from the front side of its axis of rotation about the turning center of the lathe and in the construction as shown in Figs. 1 and 2 the means for mounting this tool on the bracket are also utilized for securing this tool and the bracket on the cross slide. In their preferred form these mounting means are constructed as follows:

The numeral 24 is an upright tool post which has its lower end arranged in an opening 25 in the front arm 17 of the bracket and provided with a T-shaped head 26 which is connected therewith by a vertical pivot 27 which forms a swivel joint whereby this post may be turned relative to this head and the bracket for bringing the tool carried thereby into the desired position. This head fits into the T-shaped slot 21 of the cross slide, as shown in Fig. 2, and permits of sliding this bracket and post 24 on the cross slide lengthwise of the axis of the chuck and work piece.

In its central part the tool post is provided with a vertical slot 28 which receives a tool holder 29 upon the inner end of which the front cutting tool 23 is mounted. Within the lower part of the slot 28 in the tool post is arranged a rocking gib 30 the upper side 31 of which is straight and engages with the correspondingly shaped underside 32 of the tool holder 29 while the lower side 33 of this gib is curved convexly and is seated on the concave bottom 34 of a spherical socket formed on the upper side of the front arm 17 of the bracket 16.

The numeral 35 represents a vertical clamping screw which works in a threaded opening in the upper end of the tool post and engages its lower end with the upper side of the tool holder 29. When the clamping screw 35 is loose the tool holder may be moved crosswise in the post and also rocked with the gib 30 and also moved with the gib and tool post lengthwise of the lathe and also turned horizontally for bringing the tool into the required position relative to the work piece after which tightening of this clamping screw will retain these parts in working position.

On the rear arm 18 of the supporting bracket cutting means may be mounted which can be brought into operative position relative to the work piece for producing a cut thereon which is different from the cut produced on the work piece by the cutting means mounted on the front arm of the supporting bracket. Although these rear cutting means may be varied to suit the particular work in hand those shown in Figs. 1–5, as an example, are designed for selectively presenting one or another of a plurality of tools to the work piece, three of such tools 36, 37, 38 being employed in this case and each designed to produce different cuts on the work piece. These tools are mounted in circumferentially spaced seats on the periphery of a rotatable tool holder or turret 39 by means of clamping screws 40. This turret may be rotated about a vertical axis which in this case is provided by a clamping screw 41 for the purpose of bringing any one of the tools 36, 37, 38 into the working position relative to the work piece.

For the purpose of enabling each tool 36, 37, 38 to be turned vertically on the turret 39 for bringing the respective tool into the required position relative to the work piece, a rockable gib 70 is arranged below each of these tools and provided on its underside with a curved face 71 which engages with a curved face 72 on the adjacent part of the turret 39, as shown in Fig. 3. This turret rests with its lower end on the upper end of a cap 42 which latter is connected by a screw joint 43 with the upper end of a tool post 44 mounted on the rear arm 18 of the supporting bracket. The clamping screw 41 bears with the head 45 at its upper end against the top of the turret and engages its lower threaded end with a threaded opening in the post 44 so that when this screw is loose the turret may be turned for bringing the desired tool thereon into working position and thereafter held in place by tightening this screw. For the purpose of definitely locating the turret in any one of three working positions and causing the several tools carried thereby to properly engage the work piece, locating means are provided which preferably consist of a locating pin 46 slidable vertically in a guide opening 47 in the turret on one side if its axis and adapted to engage its lower end with one or another of three openings 48 which are formed in properly spaced relation in the top of the screw cap 42. By turning the cap 42 on the tool post 44 in one direction or the other the turret may be raised or lowered for bringing the tools thereon into the desired position relative to the work piece, and after such adjustment the screw cap may be held against turning by means of a set screw 49 arranged on the cap and engaging a vertical groove 50 in the side of the tool post 44, as shown in Figs. 2 and 5.

Adjustment of the rear tool post 44 in a direction lengthwise of the axis of the chuck for the purpose of bringing the tools mounted thereon into the desired position relative to the work piece is preferably effected by providing the lower end of this tool post with a T-shaped head 51 which is adjustable in a correspondingly shaped slot 52 in the rear arm 18 of the bracket in a direction lengthwise of the lathe, and a clamping screw nut 53 arranged on the lower threaded part of the tool 44 and bearing against the upper side of this arm, as shown in Figs. 2 and 3.

By turning the cross slide screw 15 in one direction or the other the cross slide will be moved transversely of the work piece for engaging the latter either by the front cutting means or the rear cutting means which are mounted on the respective parts of the supporting bracket 16 and thus enable an ordinary single slide lathe to do work which is generally done by a more elaborate lathe, whereby the expense of equipment and cost of doing a variety of work is materially reduced.

Instead of employing a multiple tool holder or turret on the rear arm 18 of the bracket a single cutting tool 54 may be mounted to be utilized by the following means shown in Figs. 7 and 8:

The numeral 55 represents an upright post provided at its lower end with a T-shaped head 56 which engages with the correspondingly shaped slot 52 in the rear supporting arm 18. This post is also provided with a vertical slot 57 which receives the shank of the tool 54, also an upper straight gib 58 which engages with the upper straight side of the shank of the tool 54, also a lower rocking gib 59 which has a straight upper side 60 engaging with the straight underside of the shank of the tool 54, and also a lower spacer 61 which has a straight lower side 62 engaging with the flat top of the bracket arm 18 and a concave upper side 63 which engages with the convex underside 64 of the lower gib 59. In its upper end the tool post 55 is provided with a clamping screw 65 which engages with the upper gib 58. When the screw 65 is loose the tool 54 may be adjusted crosswise on the tool post 55, also rocked vertically by means of the cooperating curved surfaces between the lower gib 59 and spacer 61 and also shifted lengthwise of the lathe by sliding the head 56 in the slot 52 until the respective tool is in the desired position after which tightening of the clamping screw 65 will hold these parts in place.

If desired a multiple tool assembly may be mounted directly on the cross slide in front of the center of the lathe, as shown in Fig. 9. In such an organization the multiple tool holder may be constructed like that shown in Figs. 1–5 and the description of the latter therefore applies equally to both, it being understood that in this multiple tool assembly the lower end of its tool post has a T-shaped head similar to the head 51 and this is adjustable lengthwise in the correspondingly shaped slot 20 on the cross slide, similar to the manner heretofore explained with reference to the structure shown in Figs. 1–5.

I claim as my invention:

1. A tool support for lathes comprising a bracket, a post mounted on said bracket and provided on its periphery with an external screw thread and a vertical groove, a cap having an internal screw thread engaging the external thread of said post, a set screw arranged on the side of said cap and engaging the vertical groove on the same, a tool supporting turret rotatable on the top of said cap, and a vertical bolt passing through said turret and having a threaded connection at its lower end with said post and provided at its upper end with a head engaging with the top of said turret.

2. A tool support for lathes comprising a bracket, a post mounted on said bracket and provided on its periphery with an external screw thread and a vertical groove, a cap having an internal screw thread engaging the external thread of said post, a set screw arranged on the side of said cap and engaging the vertical groove on the same, a tool supporting turret rotatable on the top of said cap, a vertical bolt passing through said turret and having a threaded connection at its lower end with said post and provided at its upper end with a head engaging with the top of said turret, and a locating pin slidable vertically on said turret on one side of said bolt and adapted to engage its lower end with one or another opening in the top of said cap.

FRANCIS G. CRONE.